United States Patent
Porikli

(10) Patent No.: US 7,103,229 B2
(45) Date of Patent: Sep. 5, 2006

(54) IMAGE SIMPLIFICATION USING A ROBUST RECONSTRUCTION FILTER

(75) Inventor: Fatih M. Porikli, North Plainfield, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 622 days.

(21) Appl. No.: 10/012,915

(22) Filed: Nov. 19, 2001

(65) Prior Publication Data

US 2003/0095719 A1    May 22, 2003

(51) Int. Cl.
G06K 9/40    (2006.01)
G06K 9/36    (2006.01)

(52) U.S. Cl. .................... 382/275; 382/276
(58) Field of Classification Search ............... 382/108, 382/109, 113, 206, 199, 203, 210, 259, 266, 382/276, 254, 275
See application file for complete search history.

(56) References Cited

U.S. PATENT DOCUMENTS 6,353,678 B1 * 3/2002 Guo et al. .................. 382/154
6,487,323 B1 * 11/2002 Bonnet et al. ............. 382/276
6,526,183 B1 * 2/2003 Bonnet et al. ............. 382/284

OTHER PUBLICATIONS

"Numerical Recipes in C: The Art of Scientific Computing", (ISBN 0-521-43108-5), 1988-1992, Cambridge University Press, pp. 699-706.
Black and Rangarajan, "On the Unification of Line Process, Outliner Rejection, and Robust Statistics with Applications in Early Vision," International Journal of Computer Vision (in-press), Submitted Nov. 1993.

* cited by examiner

Primary Examiner—Bhavesh M. Mehta
Assistant Examiner—Wes Tucker
(74) Attorney, Agent, or Firm—Dirk Brinkman; Andrew J. Curtin

(57) ABSTRACT

A method simplifies a data structure representing physical measurements of a real-world phenomena, such as an image of a scene of an object. Input data are first acquired, sensed, or measured. If the data are acquired with a camera, then measurement errors for data points in the data structure are not normally distributed. Therefore, an error term for each data point is constructed according to a Lorentzian estimator. The error term can be determined by taking a difference between the value of the data point, and the value at the data point when a model is fitted to the data structure. The error term is then minimized using a downhill simplex minimization process. Finally, each data point is adjusted by the minimized error term to produce a simplified data structure of the real-world phenomena.

15 Claims, 4 Drawing Sheets

IMAGE SIMPLIFICATION USING A ROBUST RECONSTRUCTION FILTER

FIELD OF THE INVENTION

This invention relates generally to image processing, and more generally to image simplification.

BACKGROUND OF THE INVENTION

The present invention applies filters to digitized images so that the images can be simplified. Because filtering techniques are pervasive in many different image-processing applications, common filters and their usual applications are now distinguished so that the filters according to the invention, and their application to image simplification techniques are not confused with prior art other image processing applications. Image simplification according to the invention is not concerned with noise, smoothness, edge, classification, or reconstruction filtering, which are now distinguished in greater detail.

Noise Filtering

Filtering can remove noise contaminations from digital images. Some common types of the noise removal filters are low-pass filters, neighborhood-averaging filters, median filters, mode filters, reconstruction filters, enhancement filters, morphological filters, Laplacian filters, Gaussian filters, to name but a few. Gaussian filters remove high-frequency noise but cause blurring. Gaussian filters are the most common noise filters used in image reconstruction, and are described in further detail below. There, a normal convolution kernel is applied to localized regions of pixels of the image. A harmonic filter is a non-linear mean filter that is also good for removing Gaussian noise and positive outliers.

Smoothness Filtering

Low pass filtering, otherwise known as "smoothing," removes high spatial frequency noise from a digital image. Noise is often introduced during analog-to-digital conversion as a side effect of the physical conversion of analog patterns of light energy into digital electrical signals. Low-pass filters usually move some sort of moving window operator across the image to affect all the pixels in the image. The operator affects one pixel of the image at a time, changing its value by some function of a local region of pixels. Neighborhood-averaging filters replace the value of each pixel by a weighted-average of the pixels in some neighborhood near the pixel. If all the weights are equal, then the operator is a mean filter. Morphological filters can also be used to remove image irregularities. A special kind of morphological filter is a dilation filter that can be used to smooth small regions of pixels with negative gray-levels Edge Filtering Median filters change each pixel value by the median of its neighboring pixels, i.e., the value such that 50% of the values in the neighborhood are above the pixel's value, and 50% of the values are below the pixel's value. This can be difficult and costly to implement due to the need for sorting the values. However, this method is generally very good at preserving edges. Median filters remove long tailed impulsive noise with a minimum amount blurring. Median filters are scalable, have constant additivity, but are non-linear. Therefore, median filters are hard to analyze. A Laplacian filter is a generalization of the second derivative and is also usually reserved for edge filtering.

Classification Filtering

Mode filters replace each pixel value by the value of the most common neighboring pixel. This is a particularly useful filter for image classification applications where the pixels correspond to objects that must be placed into a class. The mode filter is also used for remote sensing, for example, here the classes are some type of terrain, crop type, water, etc.

Reconstruction Filtering

In reconstruction filtering, an image is restored based on some knowledge of the type of degradation the image has undergone. Filters that enable image reconstruction are often called "optimal filters." Image reconstruction can also remove noise while preserving some local constraints such as edges that generally correspond to object boundaries. Reconstruction can be considered a smoothing operation that does not adversely affect object boundaries.

Frequently, images are reconstructed to better estimate content of the images. By regularizing or smoothing the brightness of the images, the reconstruction works as an independent smoothness constraint in disparity estimation, surface model fitting, and optical flow based motion estimation processes, see Black et al., "*The outlier process: unifying line process and robust statistics,*" IEEE Conf. on Computer Vision and Pattern Recognition, Seattle, (1994), and Black et al., "*Estimating optical flow in segmented images using variable-order parametric models with local deformations,*" IEEE Transactions on Pattern Analysis and Machine Intelligence, (1998).

Image reconstruction is also applicable to modeling spatial discontinuities, see Geman et al., "*Constraint reconstruction and recovery of discontinuities,*" IEEE Transactions on Pattern Analysis and Machine Intelligence, (1992), and for problems such as surface recovery. Image reconstruction is also used for image enhancement, see Geiger et al., "*Parallel and deterministic algorithms from MRF's: Surface Reconstruction,*" IEEE Transactions on Pattern Analysis and Machine Intelligence, (1991). Enhancement filtering attempts to improve the subjectively measured quality of an image for machine interpretability. Enhancement filters are generally heuristic and application oriented.

Image Simplification

In contrast with the above image processing applications, image simplification is a tool for reducing the complexity of image patterns for various purposes including segmentation, editing, animation and manipulation, low bit rate object-based image compression. Image simplification can also be employed in scalable video coders to adapt video content to network constraints. Image simplification may be used to decrease the spatial color variance and color dynamic range. In addition, textures within the boundaries of objects can be suppressed. Therefore, it is desired to provide a method that is specifically designed for image simplification.

Downhill Simplex Minimization

As described below, the method according to the invention uses a minimization technique. One simple minimization technique is introduced here. Downhill simplex minimization was first described by Nelder and Mead in "*The downhill simplex method,*" Computer Journal, 7:391–398, 1965. The method evaluates functions instead of taking derivatives in order to determine a (local) minimum. The downhill simplex method is frequently the best method to use in case of parameter dimensions higher than twenty. The simplex method can be explained in terms of geometric figures.

A simplex is a geometrical figure of N+1 vertices in N dimensions, and all their interconnecting edges, line segments, or polygonal faces, and the like. In two dimensions, a triangle is one example a simplex, and in three dimensions, a tetrahedron. Of interest are non-degenerate simplexes, i.e., simplexes which enclose a finite N-dimensional volume. If any point of a non-degenerate simplex is taken as the origin, then the N other points define vector directions that span the N-dimensional vector space.

The method then makes it way "downhill" from a starting vertex, through the unimaginable complexity of an N-dimensional topography, until it encounters, at least, a minimum vertex. The method does this by taking a series of steps and moving a vertex with a maximum value through the opposite face of the simplex to a lower location having a lower value. These steps are called reflections, and they are constructed to conserve the volume of the simplex, and hence maintain its non-degeneracy. When it can do so, the method expands the simplex in one or another direction to take larger steps. When it reaches a "valley floor," the method contracts itself in the transverse direction and tries to "ooze" down the valley. If there is a situation where the simplex is trying to "pass through the eye of a needle," it contracts itself in all directions, pulling itself in around its minimum or "best" vertex.

The simplex method differs from the well-known and widely used Levenberg-Marquardt and Gauss-Newton methods in that the simplex method does not use derivatives. Therefore, the simplex method has better convergence properties because it is much less prone to finding false minima. One of the more remarkable features of the downhill simplex minimization method is that it requires no divisions. Thus, the "division-by-zero" problem is avoided.

SUMMARY OF THE INVENTION

The invention provides a method for simplifying images using a robust maximum-likelihood estimator. Instead of using a prior art least-squares fitting, that presumes that a measurement error is independently random and distributed according to a normal function, the invention uses a Lorentzian estimator. A model function is fitted to moving local regions of an input image. For each pixel within the local region, a distance between the pixel's value and the value of the model function at that pixel location is determined. The aggregated distances for the region are formed into a Lorentzian error norm estimator. Lorentzian error norm estimator weights outliers of the measurement inversely with respect to their deviations, unlike the least-squares estimator that magnifies outliers linearly.

For each pixel, the error function is minimized using a non-gradient based downhill simplex minimization. The invention uses the Lorentzian estimator to simplify images by treating image noise and texture as measurement deviations.

It should be noted that digital filters and robust estimators are a well known in the art of estimation theory. Robust estimators generally perform better than least-squares methods. Image reconstruction is also well-known, also, noise removal, and noise removal by robust estimators has been done before.

However, the invention is concerned with image simplification for image analysis. Image simplification reduces the complexity of image patterns for region growing based segmentation purposes. Image simplification can also decrease the spatial color variance for compression purposes. Image simplification can also be thought of as a quantizing process by image reconstruction.

Image simplification is not intended to perform noise removal by applying reconstruction filters. Image simplification is not concerned with applying reconstruction filters for the purpose of enhancing the quality of images. Nor is image simplification concerned with optical flow enhancement, or motion estimation by applying robust estimators.

In the prior art, robust estimators have primarily been used to enhance quality and resolution rather than simplify it.

Therefore, it is an object of the invention to simplify an image so that over-segmentation is reduced. Over-segmentation divides an image or video into excessive number of segments or video objects. Image simplification reduces over-segmentation. Image filtering by Gaussian filters and the like, as in the prior art, only blur images and disturbs edge structure. Morphological filters operators are computationally expensive. Prior art filtering techniques give poor results when used for image simplification.

Image simplification is useful for surveillance applications, for example, highway surveillance for traffic density analysis. There, it is not necessary to transmit all image information, e.g., texture, from the camera to a base station. Shape and dominant colors of the visible objects are mostly sufficient. Simplified images have less data, and require less bandwidth, storage, and processing. This is particularly important in surveillance applications were thousands of cameras may be used, such as in large buildings, airports, highways, or urban surveillance.

Therefore, a method simplifies a data structure representing physical measurements of a real-world phenomena, such as an image of a scene of an object. Input data are first acquired, sensed, or measured. If the data are acquired with a camera, then measurement errors for data points in the data structure are not normally distributed. Therefore, an error term for each data point is constructed according to a Lorentzian estimator. The error term can be determined by taking a difference between the value of the data point, and the value at the data point when a model is fitted to the data structure. The error term is then minimized using a downhill simplex minimization process. Finally, each data point is adjusted by the minimized error term to produce a simplified data structure of the real-world phenomena.

BRIEF DESCRIPTION OF THE DRAWINGS

FIGS. 3a–b show an error norm functions and its derivative for the least-squares fitting of FIG. 2a;

DETAILED DESCRIPTION OF THE PREFERRED EMBODIMENT

Figure 1:
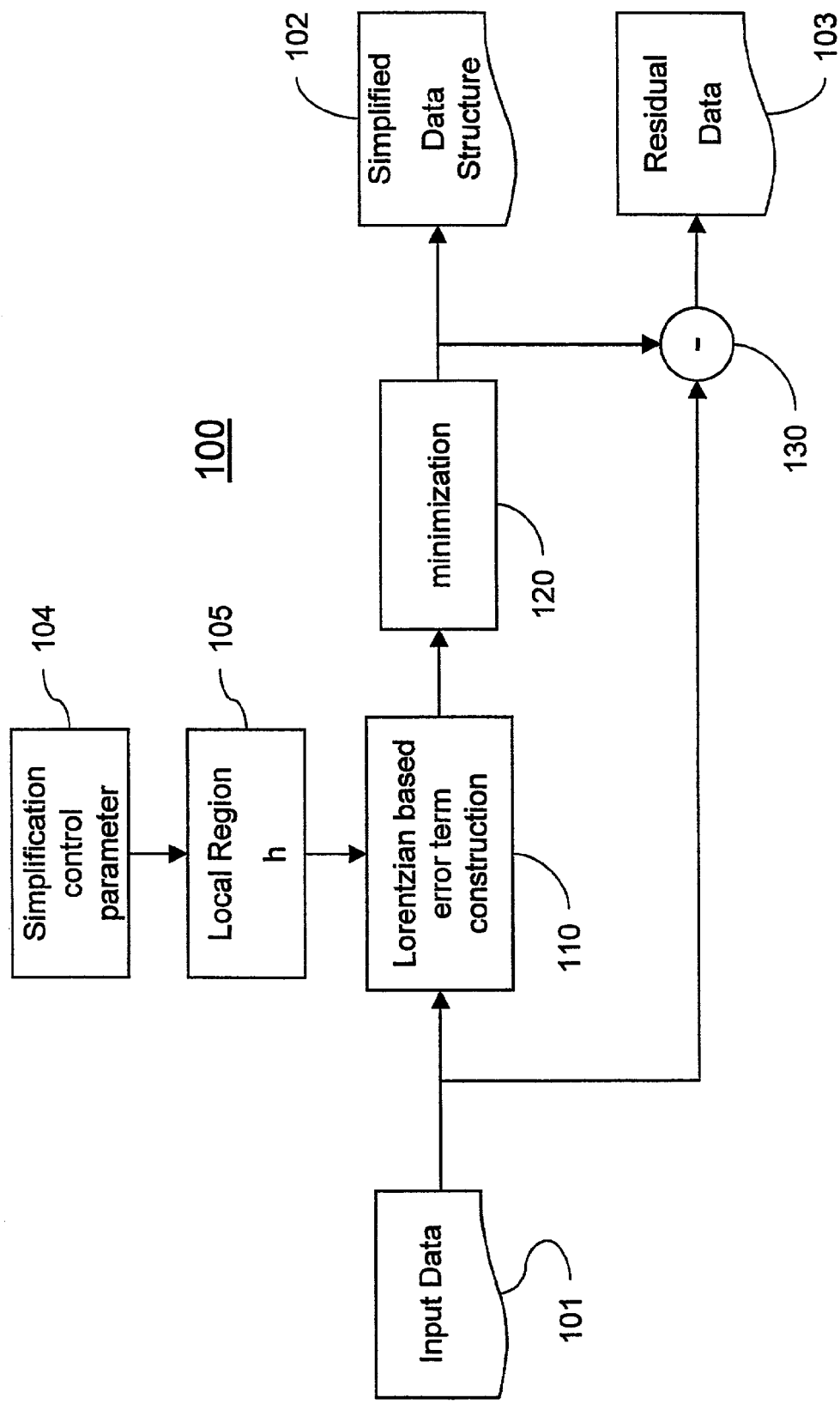
FIG. 1 is a flow diagram of an image simplification method according to the invention.

FIG. 1 shows a data simplification method 100 according to the invention. A Lorentzian based error term construction process 110 applies an error term to an input (image/video/volume) data 101 to produce a simplified data structure 102. The amount of simplification can be adjusted by a simplification control parameter 104 that in return determines a size of a local neighborhood region of data points (pixels) 105. A minimum error is determined by a downhill simplex minimization 120. The simplified data structure 102 can be subtracted 130 from the input image 101 to also produce a residual image 103. The process can be repeated to simplify an image to any desired level. Of special interest to the invention are the simplification control parameter 104, error term construction process 110, and minimization module 120.

Although the preferred embodiment of the invention is described in terms of simplification of two-dimensional digitized images or time displayed frames of a video, it should be understood that the invention can also simplify measured data having a higher dimensionality, for example, three-dimensional scanned volumetric data of humans or objects, range data, seismology data, radio-telemetry data, or high-dimensional weather data, or any other multi-dimensional data that can be measured or otherwise aquired from real-world physical phenomena and objects. Particularly, it is desired to simply measured data where the measurement error is not normally distributed, and to be able to examine and/or manipulate a simplified version of the phenomena or object.

Figures 2A, 2B:
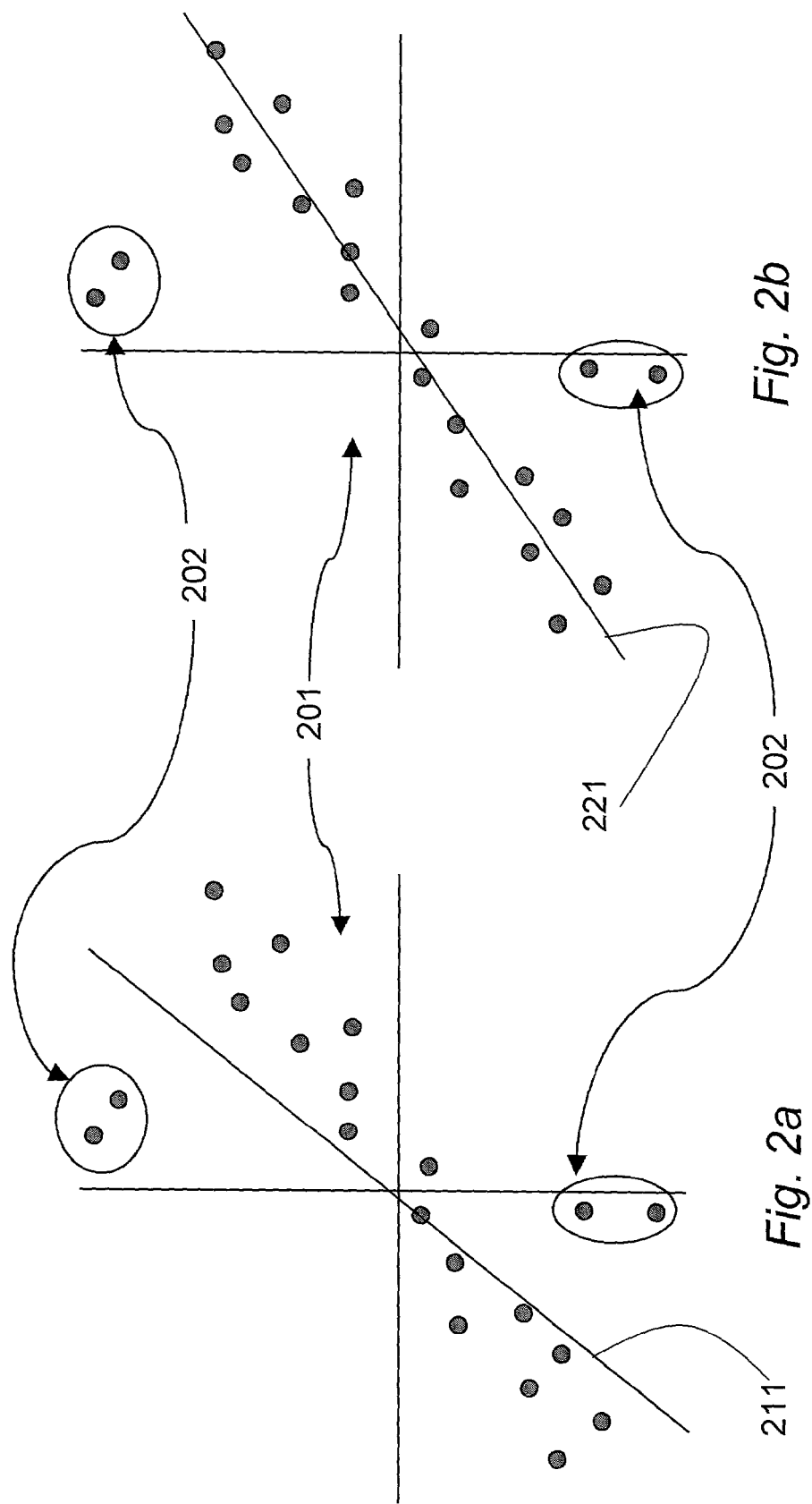
FIGS. 2a–b compare the data fitting using least-squares and Lorentzian robust estimator according to the invention.

FIG. 2a shows data fitting using a least mean squares method 211, and FIG. 2b robust estimator 221 according to the invention. Given data points 201 and 202, two the lines 211 and 221 respectively are fitted to the data points. The outlier points 202 are weighted excessively to line 211 and divert the orientation of the least-square "best-fit" line. In contrast, the robust estimator according to the invention fits the line 221, which minimizes the impact by the outlier points 202.

Data Simplification and Reconstruction

Given a set of measurements or "observation" data, e.g., pixel intensity values in a two-dimensional images, or voxel values in a three-dimensional scanned volumetric data set, it is often desired to condense, summarize, or "simplify" the data by fitting the data to a model using adjustable simplification degree parameters. Such a simplification improves the compression ratios of various image encoders by enabling compressing images and videos at higher ratios. Thus, a smaller data transmission bandwidth can be used to send and receive simplified image/video. In addition, for many applications, it is preferred to work with a simplified data structure because the complexity of the data hides otherwise simple gross features.

If N data points $(x_i; y_i)$ for $i=1, \ldots, N$ are fitted to a model that has M adjustable parameters $a_j$ for $j=1, \ldots, M$, then the model predicts a functional relationship between the measured independent and dependent variables, $$y(x)=y(x; a_1, \ldots, a_M), \quad (1)$$

where the dependence on the parameters is indicated explicitly on the right-hand side of the equation.

Least-Square Fit

A number of techniques are known to fit data to a model. The most common prior art techniques use the familiar least-squares fit, $$\min_{a_1 \ldots a_M} \sum_{i=1}^{N} [y_i - y(x_i; a_1 \ldots a_M), \sigma]^2, \quad (2)$$

where $\sigma$ is the standard deviation.

If each data point $y_i$ has a measurement error that is independently random and distributed as a normal (also called as Gaussian) distribution around the a model $y(x)$, and if the standard deviations $\sigma$ of the normal distributions are the same for all data points, then the probability P of the data set is the product of the probabilities of each data point, $$P \propto \prod_{i=1}^{N} \exp\left[-\frac{1}{2}\left(\frac{y_i - y(x_i)}{\sigma}\right)^2\right]. \quad (3)$$

Maximizing equation (3) is equivalent to maximizing its logarithm, or minimizing the negative of its logarithm, $$\sum_{i=1}^{N} \left(\frac{y_i - y(x_i)}{\sigma}\right)^2. \quad (4)$$

If the derivative of the above equation is taken with respect to the parameters $a_k$, then the resulting equations hold at the minimum, $$\sum_{i=1}^{N} \left(\frac{y_i - y(x_i)}{\sigma^2}\right)\left(\frac{\partial y(x_i; a_k)}{\partial a_k}\right) = 0 \text{ for } k = 1 \ldots M. \quad (5)$$

This demonstrates that least-squares fitting is a maximum-likelihood estimation of the fitted parameters when the measurement errors are independent and normally distributed with constant standard deviation.

Robust Estimators

The solution to the data fitting problem, described above, can be generalized by using an error norm function $\rho$ instead of the least-squares fit. Then, the fitting formula for the estimated parameters a in a model $y(x;a)$, that is, equation (2) becomes, $$\min_{a_1 \ldots a_M} \sum_{i=1}^{N} \rho(y_i - y(x_i; a_1 \ldots a_M), \sigma),$$

where $\rho$ is the error norm, and $\sigma$ is the standard deviation.

The maximum-likelihood formula for the probability P of the data set is the product of the probabilities of each data point which can be rewritten as, $$P \propto \prod_{i=1}^{N} \exp[-\rho(y_i - y(x_i; a), \sigma)], \quad (6)$$

To maximize the above equation, it is necessary to minimize the expression, $$\prod_{i=1}^{N} \rho(y_i - y(x_i; a), \sigma). \quad (7)$$

The derivative of $\rho(z)$ is defined as a function $\psi(z)$;

$$\psi(z) \equiv \frac{d\rho(z)}{dz}. \tag{8}$$

Then the generalization of the equation (5) is, $$\sum_{i=1}^{N} \frac{1}{\sigma} \psi\left(\frac{y_i - y(x_i)}{\sigma^2}\right)\left(\frac{\partial y(x_i; a_k)}{\partial a_k}\right) = 0 \text{ for } k = 1..M. \tag{9}$$

Note that for the least-squares fitting the error norm is $$\rho(y_i - y(x_i; a_1 \ldots a_M), \sigma) = \left(\frac{y_i - y(x_i; a_1 \ldots a_M)}{\sqrt{2}\,\sigma}\right)^2. \tag{10}$$

However, the least-squares approach is notoriously sensitive to outliers; the problem being that outliers contribute "too much" to the overall solution. Outlying data points are assigned a high weight by the quadratic function $\rho$. If the measurement errors are not normally distributed, or the data is corrupted by gross error, then the least-square fit is substantially less than optimal. This is described in greater detail with reference to FIGS. 3a–b and 4a–b below.

Therefore, what is needed is a robust estimator that can be applied to data whose measurement errors are not normally distributed. Such type of measurement error is typical when the data is acquired from physical phenomena such as camera images, or scanned volumes. The data simplification problem can then be described in terms finding the data structure that best fits the bulk of the data, and to identify deviating data points (outliers). These are the main goals of the robust estimator according to the invention.

When referring to a statistical estimator, the term robust is used, in general, when the estimator is insensitive to small departures from the "idealized" assumptions for which the estimator is optimized. The word small can have two different interpretations, both important: either fractionally small departures for all data points, or else fractionally large departures for a small number of data points.

To state the issue more concretely, robust statistics address the problem of finding the values for the parameters, $a=[a_1, \ldots, a_M]$, that provide the best fit of a model, $y(x;a)$, to a set of data measurements, $y_i$ in cases where the data may be corrupted by gross errors.

Of all the possible robust estimators, the preferred embodiment of the invention uses M-estimates that follow from maximum-likelihood arguments. M-estimates are usually the most relevant class for model-fitting, that is, estimation of model parameters, see Hampel et al., "*Robust statistics: the approach based on influence functions,*" John Wiley and Sons, New York, 1986.

The error norm function characterizes a bias that a particular measurement has on the solution and is proportional to the derivative, $\psi$, of the error norm $\rho$-function as can be seen in equation (9) above.

Figure 3B:
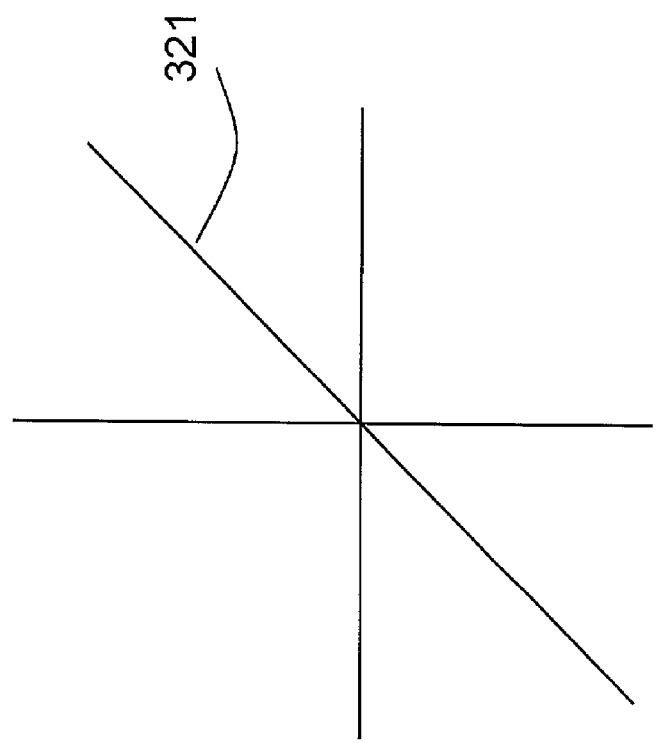
Figure 3A:
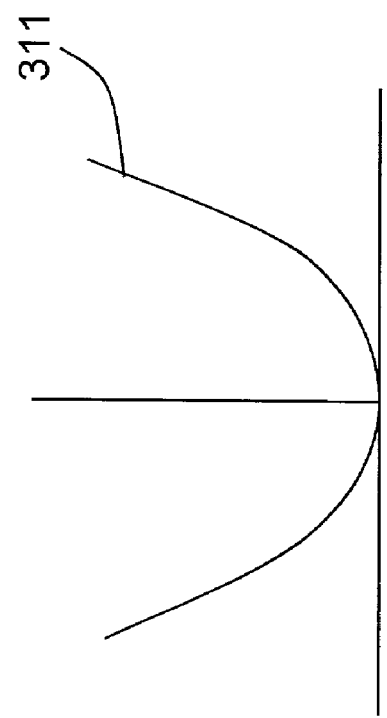

Consider, for example, the least-squares quadratic $\rho$-function $\rho(x)=x^2$ 311 shown in FIG. 3a. This function has a derivative $\psi(x)=2x$ 321 shown in FIG. 3b. Therefore, for least-squares estimation, the influence of outliers increases linearly and without bound as shown in FIG. 3a.

Lorentzian Estimator

To increase robustness, an estimator must minimize the influence of outlying measurements. Robustness can be increased by using a $\rho$-function that falls away from the quadratic more quickly.

Therefore, the invention prefers to use the Lorentzian estimator:

$$\rho(x, \sigma) = \log\left(1 + \frac{1}{2}\left(\frac{x}{\sigma}\right)^2\right) \tag{11a}$$

with a derivative $$\psi(x, \rho) = \frac{2x}{2\sigma^2 + x^2} \tag{11a}$$

As shown in FIG. 2a for normally distributed errors, the Gaussian distribution gives more weight to the deviant data points, or "outliers" 202 when fitting the line 211 to the data.

Figure 4B:
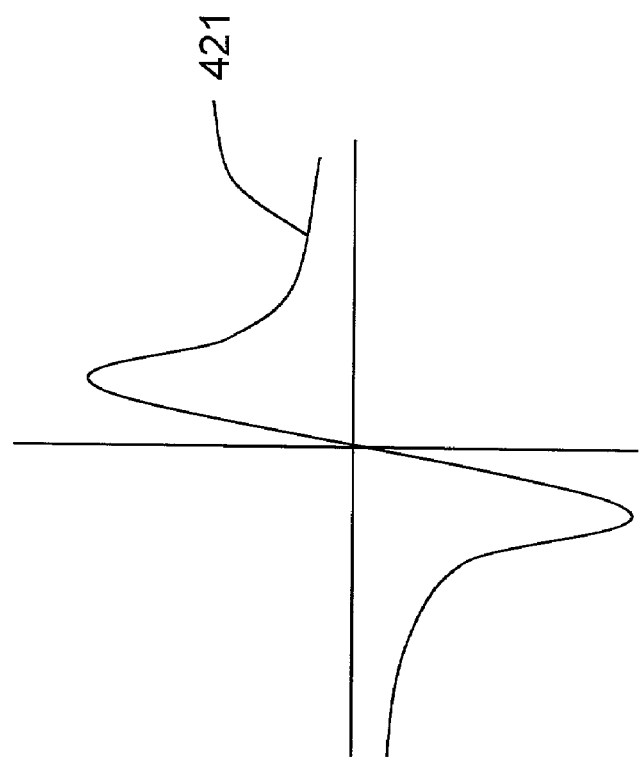
FIGS. 4a–b show an error norm function and its derivative for the Lorentzian estimator of FIG. 2b.
Figure 4A:
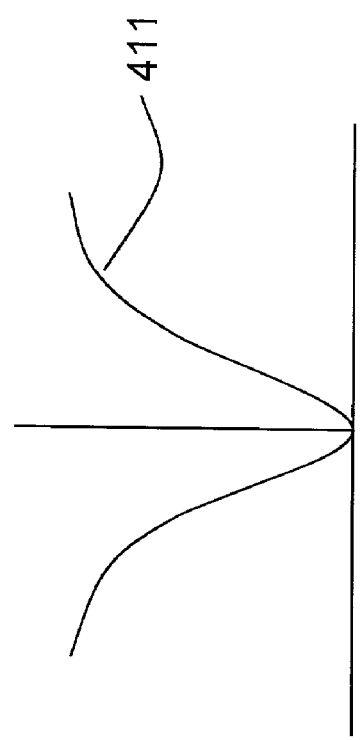

In contrast, when the tails of the distribution are very large, as modeled by the Lorentzian function 411 shown in FIG. 4a, the derivative $\psi(z)$ 421, shown in FIG. 4b, increases the weights of moderately deviant data, but then the weights decrease, so that extremely deviant data, the "true" measured outliers 202, make a very small contribution, or are not counted all in the estimation of the parameters, as shown by the line 221 in FIG. 2b.

Data Simplification

Therefore, as shown in FIG. 1, the simplification method 100 according to the invention acquires input data 101, e.g., an image or a video. In general, the input data is measured from real-world physical phenomena where the measurement errors are not normally distributed.

For each data point of the input data, a local region W centered on the data point is assigned. The size of the local region 105 is determined from the simplification parameter s 104. A model function $u(x,y;a)$ where $a=[a_1, \ldots, a_M]$, is fitted to the data values, e.g., image intensity values $I(x,y)$, within each region. For example, the data simplification method 200 according to the invention fits a brightness model u to image data $I(x, y)$, where x and y are the locations of discrete pixels in an image. The model function can be a polynomial, a piece-wise continuous function, as well as other functions that can be parameterized by a finite number of parameters. The degree of the model function is M. The order of the model function is d. The degree, order, and type of the model function can be adaptive (dynamic) to the local statistics of the input data, or it can be static and assigned initially.

Within each region of data points, an error term J(I,u, W,x',y') is determined for each data point, e.g., pixel (x',y'). The error term includes the accumulated differences between the values produced by the model function at the central data point, and the original value. Given an image brightness function $I(x, y)$, we want to recover a model surface that minimizes the error term J(I, u, W,x',y'). The error term norm is assigned as a Lorentzian function given in equation (11). The error term is defined as, $$J(I, u, W, x, y) = \sum_{(i,j) \in W} [\rho(u(i, j) - I(x+i, y+j), \sigma)]. \quad (12)$$

Error Term Minimization

After error term is constructed, the error term is minimized using, for example, a downhill simplex method. That is a non-gradient descent type of minimization is preferred. The estimated parameters $a'=[a'_1, \ldots, a'_M]$ are embedded into model function u, and a particular value $u(x',y',a')$ corresponding to the center data point, e.g., $(x',y')$ is determined. This value is assigned as the value of the data point $(x',y')$ in the simplified output image $S(x,y)$ according to, $$[a'_1, \ldots a'_M] = \arg \min J(I,u,W,x',y'), \quad (13)$$

and output data structure 102 becomes $$S(x, y) = u(x, y, a_1, \ldots a_M). \quad (14)$$

The standard deviations σ's are assumed to be constant for data point locations. The invention can also be extended to use an iterative continuation method in which a previously simplified data structure is used as the observation of a next iteration.

For color imagery, each color band is simplified separately. The size of the local region is adapted to the total number of iteration of the minimization. A large number of iteration and large regions increase the simplification of the input data, i.e., these produce a substantial amount of reduction in the texture in images. The size of the region and the number of iterations are manipulated by the simplification control parameter 104.

Therefore, the simplification control parameter s 104, normalized between [0,1], is entered as an input to the method 100. Lower values of s represents a less simplified output, and higher values correspond to greater simplified output. The region size h 105 is assigned with respect to simplification control parameter 104. If the control parameter s is low, then the region size h is correspondingly selected small.

The robust estimator based simplification according to the invention, when compared with median, lowpass, and morphological filters of the prior art, is less complex when measured in terms of the processing time corresponding the similar degree of detail or "texture" removal. Reconstructed images simplified with the method according to the invention show that local texture is removed effectively, and edges do not appear to be "smeared," as with low-pass filters. Nor, does the simplification remove boundaries as a morphological filter are want to do. Furthermore, the method is substantially faster than the median filter. Therefore, the Lorentzian error norm according to the invention is particularly useful simplifying measured or sensed data.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for simplifying a data structure representing physical measurements of a real-world phenomena, comprising:

acquiring a single input image having measurement errors that are not normally distributed for a plurality of pixels;

determining an error term for each pixel in the single input image according to a Lorentzian estimator;

minimizing the error term;

adjusting each pixel in the single input image by the minimized error term to produce a simplified single output image from the single input image of the real-world phenomena.

2. The method of claim 1 wherein the determining, minimizing and adjusting steps are applied separately to each single input image of a video.

3. The method of claim 1 wherein the determining step further comprises:

identifying a local region of pixels for each pixel in the single input image;

fitting a model function to the pixels in the single input image of each local region;

accumulating, for each pixel in the single input image, differences between pixel values according to the model function and the value of each pixel in the single input image to determine the error term for each pixel in the single input image.

4. The method of claim 3 wherein a size of the local region is set according to a simplification control parameter.

5. The method of claim 3 wherein the model function is a polynomial.

6. The method of claim 3 wherein the model function is a piece-wise continuous function.

7. The method of claim 3 wherein the model function is parameterized by a finite number of parameters.

8. The method of claim 3 further comprising:

adapting the model function dynamically to local statistics of the single input image.

9. The method of claim 3 wherein the model function is static.

10. The method of claim 1 further comprising:

subtracting the simplified single output image from the single input image to produce a single residual image.

11. The method of claim 1 wherein the Lorentzian estimator of an error term x with a standard deviation σ is $$\rho(x, \sigma) = \log\left(1 + \frac{1}{2}\left(\frac{x}{\sigma}\right)^2\right),$$

and a derivative of the Lorentzian estimator is $$\psi(x, \rho) = \frac{2x}{2\sigma^2 + x^2}.$$

12. The method of claim 1 wherein the minimizing uses a downhill simplex method.

13. The method of claim 1 further comprising:

assigning the simplified single output image to the single input image and iteratively determining, minimizing, and adjusting according to a simplification control parameter.

14. The method of claim 1 wherein each color band of the single input image is simplified separately.

15. The method of claim 1 further comprising:

reconstructing output data from the simplified single output image.

* * * * *